(No Model.)
P. MITCHELL.
TURF RACING RECORD BOOK.
No. 384,266.          Patented June 12, 1888.
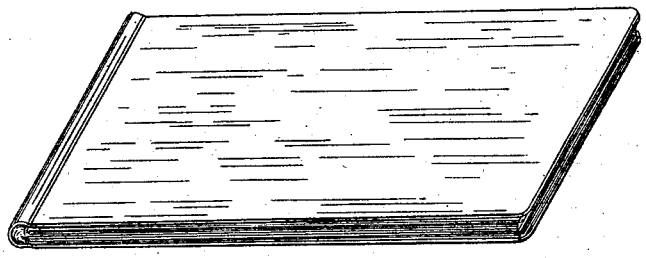
fig. 1.
fig. 2.
fig. 3.
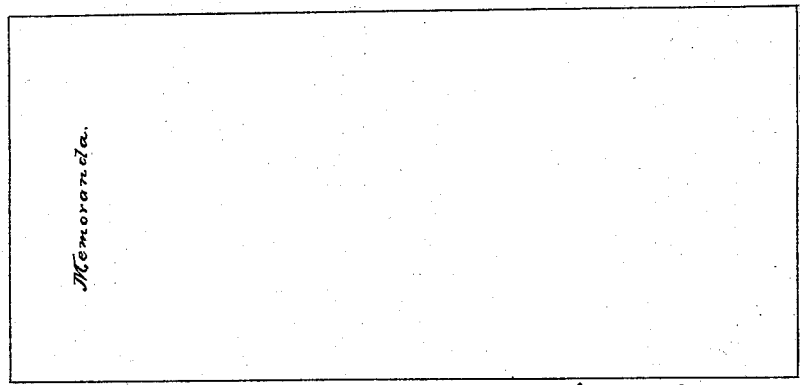
Peter Mitchell, Inventor.
Witnesses.
E. G. Delaney
Fred. O. Dufain

UNITED STATES PATENT OFFICE.

PETER MITCHELL, OF NEW YORK, N. Y.

TURF-RACING RECORD-BOOK.

SPECIFICATION forming part of Letters Patent No. 384,266, dated June 12, 1888.

Application filed April 12, 1888. Serial No. 270,423. (No model.)

*To all whom it may concern:*

Be it known that I, PETER MITCHELL, a citizen of the United States, and a resident of the city, county, and State of New York, have invented a new and useful Improvement in Turf-Racing Record-Books, of which the following is a specification, reference being had to the accompanying drawings, in which—

Figure 1 represents the book in perspective and as closed. Fig. 2 represents the front page of one of the leaves of the book, and Fig. 3 the back page of said leaf.

It consists in a series of leaves ruled on one side by vertical and horizontal lines $a$ $b$, to form columns and spaces for record-entries, and left blank on the other side for the reception of memoranda. At the top of the front page of each leaf is provided a clear space from end to end, in which are imprinted or otherwise permanently placed the words "Date" and "Track," respectively, and in the spaces immediately underneath, formed by the intersection of the said vertical lines and the heavy horizontal line $c$, are permanently placed the words "Number race, Distance, Amount bet, Name of horse, Name of bettor, Won, Lost, Time, Weight, Name of jockey," and the word "To" beneath the words "Amount bet," between two closely parallel lines, referring to the sums bet one against the other, all as shown in Fig. 2. Besides the first and second row of spaces and the words imprinted therein on the front page of each leaf and forming the headings thereof, as shown, are a number of other spaces, the same being formed by the intersection of the vertical lines and resultant columns, with a series of horizontal lines extending from end to end and carried down to the bottom of the page, and forming spaces under their appropriate heads for the reception of entries or tabulated record comprising the actual number of each race, the distance and time involved, the amount bet, the name of the horse, the name of the bettor, the amount won or lost, and the weight and name of the jockey, together with the date of the race and name of the track. The other or reverse page is left essentially blank, and is intended to be used for entries of a general character merely, and having the word "Memoranda" printed at top of page to indicate that purpose, as shown in Fig. 3. These pages are bound together into book form, and may be attached to the cover at its shorter end, next the words "No race," or at the top, running longitudinally.

Having described my invention, what I claim as new is—

A turf-racing record and memorandum book composed of a series of leaves having their front pages ruled with vertical and horizontal lines $a$ $b$ $c$, to form columns and spaces for the reception of entries comprising a tabulated record of a race, and provided on the top with a horizontal column or space running from end to end, with the words "Date" and "Track" permanently placed therein, and a similar column or space immediately underneath, divided at intervals by the intersecting vertical lines $a$ into smaller spaces, and carrying the words permanently placed therein of "Number race, Distance, Amount bet, Name of horse, Name of bettor, Won, Lost, Time, Weight, Name of jockey," constituting the permanent headings, all substantially as described and shown, and for the purpose specified.

In witness whereof I have hereunto subscribed my name, this 28th day of April, 1888, in presence of two witnesses.

PETER MITCHELL.

Witnesses:
E. G. DELANEY,
FRED. O. SWAIN.